United States Patent
Inagaki et al.

(10) Patent No.: US 6,541,592 B1
(45) Date of Patent: Apr. 1, 2003

(54) THERMOPLASTIC ELASTOMER COMPOSITION AND ETHYLENE-α-OLEFIN COPOLYMER

(75) Inventors: Katsunari Inagaki, Ichihara (JP); Tadaaki Nishiyama, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 09/636,651

(22) Filed: Aug. 9, 2000

(30) Foreign Application Priority Data

| Aug. 12, 1999 | (JP) | 11-228476 |
| Sep. 2, 1999 | (JP) | 11-248608 |
| Nov. 16, 1999 | (JP) | 11-325132 |

(51) Int. Cl.$^7$ ............................................. C08F 10/14
(52) U.S. Cl. ................. 526/348.2; 526/348.5; 526/348.6
(58) Field of Search .................. 526/348.2, 348.5, 526/348.6

(56) References Cited

U.S. PATENT DOCUMENTS 4,997,713 A * 3/1991 Koehnlein et al. .......... 428/379
5,449,713 A * 9/1995 Nakahama ................. 524/491
5,780,570 A * 7/1998 Tanaglia ..................... 526/86

FOREIGN PATENT DOCUMENTS

| JP | 61-4708 A | 1/1986 |
| JP | 06-18942 B | 6/1994 |
| JP | 07-53801 A | 7/1995 |
| JP | 09-241325 A | 9/1997 |

* cited by examiner

*Primary Examiner*—David W. Wu
*Assistant Examiner*—William K. Cheung
(74) *Attorney, Agent, or Firm*—Fitch, Even, Tabin & Flannery (57) ABSTRACT

A thermoplastic elastomer composition comprising 5 to 95 wt % of the following (A) and 5 to 95 wt % of the following (B), wherein the flowability index I according to a test for flow properties with a capillary rheometer is 1.35 or more:

(A) an ethylene-α-olefin copolymer having a tensile stress $M_{100}$ measured according to JIS-K-6251 of 2.5 MPa or less, (B) a polyolefin-based resin having a tensile stress $M_{100}$ measured according to JIS-K-6251 of 2.5 MPa or more.

9 Claims, 1 Drawing Sheet

Fig.1

THERMOPLASTIC ELASTOMER COMPOSITION AND ETHYLENE-α-OLEFIN COPOLYMER

BACKGROUND OF THE INVENTION

1. Field of the Invention

The present invention relates to a thermoplastic elastomer composition, a molded article obtained by using the thermoplastic elastomer composition and an ethylene-α-olefin copolymer. More specifically, the present invention relates to a thermoplastic elastomer composition which has excellent flexibility and processability, manifests no bleed of low molecular weight components, and particularly excellent in extrusion processability and calender processability, an extrusion molded article obtained by extrusion molding the thermoplastic elastomer composition or a calender molded article obtained by calender molding the thermoplastic elastomer composition, and an ethylene-α-olefin copolymer.

2. Description of Related Art

Soft vinyl chloride materials having good balance between mechanical strength and flexibility are a material excellent in processability and cost performance. However, the use thereof is restricted due to recent environmental problems. On the other hand, an ethylene-α-olefin copolymer rubber can be listed as the polyolefin-based material excellent in recycling property. The ethylene-α-olefin copolymer rubber is used widely as an automobile material, construction material, wire material and polyolefin-modifying material, together with ethylene-α-olefin-non-conjugated diene rubber such as EPDM and the like. In these uses, excellent processability, particularly excellent roll processability and excellent extrusion processability are required in addition to excellent vulcanization property. From this standpoint, an ethylene-α-olefin-non-conjugated diene rubber such as EPDM and the like having excellent processability by inclusion of a diene component is used more widely than ethylene-α-olefin copolymer rubber. As the conventional technology for further improving processability, there is a method in which ethylene-α-olefin-non-conjugated diene rubber having wider molecular weight distribution is produced by using a special catalyst such as a vanadate of secondary alcohol and the like as disclosed, for example, in Japanese Patent Application Laid-Open (JP-A) No. 61-4708. Further, Japanese Patent Application Publication (JP-B) No. 6-18942 discloses a rubber composition obtained by compounding a vulcanized rubber compounding agent into ethylene-α-olefin-non-conjugated diene copolymer rubber having wide molecular weight distribution. The rubber containing a diene component has excellent processability, but may cause a problem of remaining of odor in the final product since this rubber contains a diene monomer odor as compared with rubber containing no diene component.

Further, JP-A No. 9-241325 discloses an ethylene-α-olefin copolymer rubber which has excellent processability, heat-resistance and high tensile strength, causes no bleed in low molecular weight parts, and has a specific composition, molecular weight and molecular weight distribution. However, in view of recent further strict quality requirements, this method include problems that prevention of bleed is insufficient, the surface appearance of the final product using the above-mentioned copolymer is degraded, further, pellets of the copolymer adhere each other under a slight load and small block form can not be maintained for a long period of time, workability and handling such as transportation and measurement in compounding into a polyolefin-based resin are insufficient.

SUMMARY OF THE INVENTION

The present inventors have intensively studied a thermoplastic elastomer composition having no above-mentioned problems, and found that a thermoplastic elastomer composition comprising a specific ethylene-α-olefin copolymer and a specific polyolefin-based resin is excellent in extrusion processability and calender processability, and gives excellent flexibility and processability, and manifests no bleed of low molecular weight components when made into an extrusion molded article or calender-molded article, and have completed the present invention.

Namely, the present invention relates to a thermoplastic elastomer composition comprising 5 to 95 wt % of the following (A) and 5 to 95 wt % of the following (B), wherein the flowability index I according to a test for flow properties with a capillary rheometer is 1.35 or more:

(A) an ethylene-α-olefin copolymer having a tensile stress $M_{100}$ measured according to JIS-K-6251 of 2.5 MPa or less, (B) a polyolefin-based resin having a tensile stress $M_{100}$ measured according to JIS-K-6251 of 2.5 MPa or more.

DETAILED DESCRIPTION OF THE PREFERRED EMBODIMENTS

The present invention will be described below.

The present invention relates to a thermoplastic elastomer composition comprising 5 to 95 wt % of the following (A) and 5 to 95 wt % of the following (B), wherein the flowability index I according to a test for flow properties with a capillary rheometer is 1.35 or more:

(A) an ethylene-α-olefin copolymer having a tensile stress $M_{100}$ measured according to JIS-K-6251 of 2.5 MPa or less, (B) a polyolefin-based resin having a tensile stress $M_{100}$ measured according to JIS-K-6251 of 2.5 MPa or more.

The component (A) in the present invention is an ethylene-α-olefin copolymer having a tensile stress $M_{100}$ measured according to JIS-K-6251 of 2.5 MPa or less. The component (A) should has a tensile stress $M_{100}$ measured according to JIS-K-6251 of 2.5 MPa or less, preferably of 2.0 MPa or less. When this value is excess, a molded article obtained by molding the resulting thermoplastic elastomer composition is poor in flexibility.

The component (A) is preferably an ethylene-α-olefin copolymer satisfying the following conditions (a) to (c), more preferably an ethylene-α-olefin copolymer additionally satisfying the following condition (d), further preferably an ethylene-α-olefin copolymer further additionally satisfying the following conditions (e) to (g).

(a) α-olefin content is from 5 to 95 wt %, (b) Mooney viscosity: $ML_{1+4}100°$ C. is from 5 to 70, (c) Q value (weight-average molecular chain length/number-average molecular chain length) in GPC measurement is 4 or more, (d) a molecular weight distribution curve is bimodal, (e) a ratio (H=X1/X2) of high molecular weight peak height X1 to low molecular weight peak height X2 in a molecular weight distribution curve is from 2.0 to 7.0, (f) an area of low molecular weight parts having chain lengths of 100 Å or less in a molecular weight distribution curve is 3% or less, (g) heat of fusion of a crystal at temperature of from 50 to 100° C. is 5 mJ/mg or more when measured by a differential scanning calorimeter (DSC).

Specific examples of the α-olefin in the component (A) include propylene, 1-butene, 3-methyl-1-butene, 4-methyl-1-pentene, 1-hexene, 1-octene, 1-decene, 1-dodecene, 1-hexadecene, 1-eicosene and the like. Among them, an α-olefin having 3 to 8 carbon atoms is preferable. When the carbon number of the α-olefin is 9 or more, the monomer cost of the α-olefin becomes high, and may induce disadvantage from the viewpoint of industrial production. These α-olefins may be used alone or in combination thereof. The α-olefin content in the copolymer of the present invention is preferably from 5 to 95 wt %, more preferably from 20 to 90 wt %, further preferably from 20 to 40 wt %, most preferably from 25 to 40 wt %. When the α-olefin content is too low, bleed may occur on the surface of a molded article obtained by molding the resulting thermoplastic elastomer composition. On the other hand, when the α-olefin content is too high, a molded article obtained by molding the resulting thermoplastic elastomer composition may be poor in strength.

The Mooney viscosity: $ML_{1+4}100°$ C. of the component (A) is preferably from 5 to 70, more preferably from 15 to 70, and further preferably from 20 to 60. When the Mooney viscosity is too low, a molded article obtained by molding the resulting thermoplastic elastomer composition may be poor in strength. On the other hand, when the Mooney viscosity is too high, a molded article obtained by molding the resulting thermoplastic elastomer composition may has deteriorated extrusion processability.

The Q value (weight-average molecular chain length/number-average molecular chain length) in GPC measurement of the component (A) is preferably 4 or more, more preferably 6 or more. When the Q value is too low, a molded article obtained by molding the resulting thermoplastic elastomer composition may has deteriorated extrusion processability and calender processability. Higher Q value is preferable from the standpoints of extrusion processability and calender processability, providing the constitution conditions of the present invention are satisfied. Measurement of the Q value is conducted by a gel permeation chromatography (GPC) method (for example, 150C/GPC apparatus, manufactured by Waters Co.). The elution temperature is 140° C., the column used is, for example, Shodex Packed Column A-80M manufactured by Showa Denko K.K., and as the molecular weight reference material, polystyrene (for example, manufactured by Tosoh Corp., molecular weight; 8,400,000) is used. The resulted weight-average molecular weight in terms of polystyrene is represented by Mw, the resulted number-average molecular weight in terms of polystyrene is represented by Mn, and the ratio of them (Q value=Mw/Mn) is molecular weight distribution. As the measuring sample, about 5 mg of a polymer is dissolved in 5 ml of o-dichlorobenzene so as to obtain a concentration of about 1 mg/ml. The resulted sample solution (400 μl) was injected, and detection was conducted by a refractive index detector at an elution solvent flow rate of 1.0 ml/min.

The component (A) preferably manifests a bimodal molecular weight distribution curve. When the molecular weight distribution has single peak, spreading of the molecular weight distribution is insufficient, and a molded article obtained by molding the resulting thermoplastic elastomer composition may has deteriorated extrusion processability, particularly, deteriorated extruded surface, and deteriorated calender processability.

The ratio (H=X1/X2) of high molecular weight peak height X1 to low molecular weight peak height X2 in a molecular weight distribution curve of the component (A) is preferably from 2.0 to 7.0, further preferably from 2.2 to 6.0. When H is too low, bleed may occur on the surface of a molded article obtained by molding the resulting thermoplastic elastomer composition. On the other hand, when H is too high, extrusion processability, particularly extruded surface may deteriorate, and the extrusion amount may decrease.

In the molecular weight distribution curve of the component (A), the area of low molecular weight parts having chain lengths of 100 Å or less is preferably 3% or less, more preferably 2% or less. When this area is too large, bleed may occur on the surface of the final product of the above-mentioned copolymer or a pellet of the copolymer.

Heat of fusion of a crystal of the component at temperature of from 50 to 100° C. is preferably 5 mJ/mg or more, more preferably 8 mJ/mg or more, when measured by a differential scanning calorimeter (DSC). When this value is too small, extrusion processability, particularly shape retaining property of the copolymer may deteriorate. As the differential scanning calorimeter, there is used, for example, DSC220 manufactured by Seiko Instruments Inc., and the measurement is conducted at a rate of 10° C./min. in temperature rising process.

The component (A) can be produced by polymerizing ethylene and α-olefin using a single reactor or twin reactor in the presence of a catalyst system obtained by combining the following components (C) to (E). A three or more reactor may also be used, providing the constitution conditions of the present invention are satisfied.

As the component (C), a vanadium compound represented by the general formula $VO(OR)_nX_{3-n}$ (wherein, R is a hydrocarbon group, X is halogen, $0 \leq n \leq 3$) can be used, and examples thereof include $VOCl_3$, $VO(OCH_3)Cl_2$, $VO(OCH_3)_2Cl$, $VO(OCH_3)_3$, $VO(OC_2H_5)Cl_2$, $VO(OC_2H_5)_2Cl$, $VO(OC_2H_5)_3$, $VO(OC_3H_7)Cl_2$, $VO(OC_3H_7)_2Cl$, $VO(OCH_3H_7)_3$, $VO(O\text{-iso-}C_3H_7)Cl_2$, $VO(O\text{-iso-}C_3H_7)_2Cl$, $VO(O\text{-iso-}C_3H_7)_3$, $VO(O\text{-n-}C_4H_9)Cl_2$, $VO(O\text{-n-}C_4H_9)_2Cl$, $VO(O\text{-n-}C_4H_9)_3$ or mixtures thereof. Among them, those other than $VOCl_3$ can be obtained easily by reacting $VOCl_3$ with alcohol or reacting $VOCl_3$ with $VO(OR)_3$.

As the component (D), an organoaluminum compound represented by the general formula $R'_mAlX_{3-m}$ (wherein, R' is a hydrocarbon group, X is halogen, $0 \leq n \leq 3$) can be used, and examples thereof include $(C_2H_5)_2AlCl$, $(C_4H_9)_2AlCl$, $(C_6H_{13})_2AlCl$, $(C_2H_5)_{1.5}AlCl_{1.5}$, $(C_4H_9)_{1.5}AlCl_{1.5}$, $(C_6H_{13})_{1.5}AlCl_{1.5}$, $C_2H_5AlCl_2$, $C_4H_9AlCl_2$, $C_6H_{13}AlCl_2$ and the like.

Though the copolymer of the present invention can be obtained by using a catalyst system consisting essentially of the component (C) and the component (D), the following component (E) may also be combined for the purpose of further reducing the amount of low molecular weight components which is a main factor of bleed.

As the component (E), a halogenated ester compound represented by the following general formula can be used.

(E)

(wherein, R" is an organic group having 1 to 20 carbon atoms, partially or completely substituted by halogen atoms, and R''' is a hydrocarbon group having 1 to 20 carbon atoms.). A compound in which the substituent R'' is completely substituted by chlorine atoms is preferable, and a perchlorocrotonate is further preferable. Examples thereof include ethyldichloroacetate, methyltrichloroacetate, ethyltrichloroacetate, methyldichlorophenylacetate, ethyldichlorophenylacetate, methylperchlorocrotonate, ethylperchlorocronate, propylperchlorocrotonate, isopropylperchlorocrotonate, butylperchlorocrotonate, cyclopropylperchlorocrotonate, phenylperchlorocrotonate and the like.

It is preferable that the molar ratio of the organoaluminum compound (D) to the vanadium compound (C) is 2.5 or more and the molar ratio of the halogenated ester compound (E) to the vanadium compound (C) is 1.5 or more, in the polymerization reaction.

The component (A) in the present invention can be produced by using one or more of known Ziegler-Natta catalysts or known single site catalysts and using a single reactor or two or more reactor. A known single site catalyst is preferable from the standpoint of the uniformity of the composition distribution of the resulting polymer, and examples of such a single site catalyst include, for example, metallocene-based catalysts described in JP-A Nos. 58-19309, 60-35005, 60-35006, 60-35007, 60-35008, 61-130314, 3-163088, 4-268307, 9-12790, 9-87313, 10-508055, 11-80233, Japanese Patent Kohyo Publication No. 10-508055 and the like, non-metallocene-based complex catalysts described in JP-A Nos. 10-316710, 11-100394, 11-80228, 11-80227, Japanese Patent Kohyo Publication No. 10-513489, JP-A Nos. 10-338706 and 11-71420. Among them, a metallocene-based catalysts are generally used. As the suitable matallocene catalyst of them, a complex of a III to XII transition metal in periodic table which has at least one cyclopentadiene type anion skeleton and has a $C_1$ symmetrical structure is preferable from the standpoint of the flexibility of the resulting polymer. Further, as the example of a suitable production method using a metallocene catalyst in obtaining a polymer having high molecular weight, a method is exemplified in which ethylene and α-olefin are copolymerized in the presence of an olefin polymerization catalyst comprising the following (α), (β) and/or (γ).

(α): at least one of transition metal complexes represented by the following general formulae [I] to [III], (in each of the above-described general formulae [I] to [III], $M^1$ represents a IV group transition metal atom in periodic table of element, A represents a XVI group atom in periodic table of element, and J represents a XIV group atom in periodic table of element. $Cp^1$ represents a group having a cyclopentadiene type anion skeleton. Each of $X^1$, $X^2$, $R^1$, $R^2$, $R^3$, $R^4$, $R^5$ and $R^6$ independently represents a hydrogen atom, halogen atom, alkyl group, aralkyl group, aryl group, substituted silyl group, alkoxy group, aralkyloxy group, aryloxy group or disubstituted amino group. $X^3$ represents a XVI group atom in periodic table of element. $R^1$, $R^2$, $R^3$, $R^4$, $R^5$ and $R^6$ may optionally bond to form a ring. Two of $M^1$, A, J, $Cp^1$, $X^1$, $X^2$, $X^3$, $R^1$, $R^2$, $R^3$, $R^4$, $R^5$ and $R^6$ may be the same or different, respectively.).

(β): One or more aluminum compounds selected from the following (β1) to (β3):
 (β1): Organoaluminum compound represented by the general formula $E^1_a AlZ_{3-a}$,
 (β2): Aluminoxane having a structure represented by the general formula $\{-Al(E^2)-O-\}_b$,
 (β3): Aluminoxane having a structure represented by the general formula $E^3\{-Al(E^3)-O-\}_c AlE^3_2$:
  (wherein, $E^1$, $E^2$ and $E^3$ represent hydrocarbon groups respectively, and all of $E^1$, all of $E^2$ and all of $E^3$ may be the same or different. Z represents a hydrogen atom or halogen atom, and all of Z may be the same or different. "a" represents a number satisfying 0<a≦3, "b" represents an integer of 2 or more and "c" represents an integer of 1 or more.).

(γ): Boron compound of any of the following (γ1) to (γ3).
 (γ1): Boron compound represented by the general formula $BQ^1Q^2Q^3$.
 (γ2): Boron compound represented by the general formula $G^+ (BQ^1Q^2Q^3Q^4)$.
 (γ3): Boron compound represented by the general formula $(L-H)^+ (BQ^1Q^2Q^3Q^4)$.
  (wherein, B is a boron atom in atomic trivalent, $Q^1$ to $Q^4$ may be the same or different and represent a halogen atom, hydrocarbon group, halogenated hydrocarbon group, substituted silyl group, alkoxy group or disubstituted amino group. $G^+$ is an inorganic or organic cation, L is a neutral Lewis acid, and $(L-H)^+$ is a Broensted acid.).

Specific examples of the inactive hydrocarbon medium used in preparing a catalyst include aliphatic hydrocarbons such as propane, butane, pentane, hexane, heptane, octane, decane, dodecane, kerosene and the like, alicyclic hydrocarbons such as cyclopentane, cyclohexane, methylcyclopentane and the like, aromatic hydrocarbons such as benzene, toluene, xylene and the like, halogenated hydrocarbons such as ethylene chloride, chlorobenzene, dichloromethane and the like, or mixtures thereof. The preparation temperature is preferably in the range of from −100° C. to 250° C., and pressure and time can be set in any ranges.

Polymerization of the component (A) is conducted in a hydrocarbon solvent. Examples of the hydrocarbon solvent include aliphatic hydrocarbons such as pentane, hexane, heptane, octane, decane, dodecane, kerosene and the like, alicyclic hydrocarbons such as cyclohexane, methylcyclopentane, methylcyclohexane and the like, and aromatic hydrocarbons such as benzene, toluene, xylene and the like. Also, α-olefins such as propylene, 1-butene, 1-pentene, 1-hexene and the like can be used as a part of all of the solvent. The polymerization temperature is preferably from 40 to 160° C., and further preferably from 40 to 80° C. from the standpoints of productivity and control of molecular weight.

The polymerization is conducted under pressure or atmospheric pressure using a single reactor or a two reactor in line, and preferably carried out at 0.1 to 5 MPa, particularly preferably at 0.1 to 2 MPa. The average retention time of the reaction liquid per one polymerization bath is preferably from 2 to 180 minutes, further preferably from 20 to 120 minutes, and the polymer concentration is preferably 15 wt % or less, further preferably 12 wt % or less from the standpoint of reduction of the viscosity of the reaction liquid.

As a material used to control the molecular weight of the component (A), hydrogen, diethylamine, arylchloride pyridine-N-oxide and the like are exemplified, and hydrogen is particularly preferable.

When two reactors are used, the temperatures of the first reactor and the second reactor can be set arbitrary and the molecular weight controlling agent can be arbitrary set, and it is preferable that a polymer having high molecular weight is produced in the first reactor and a polymer having low molecular weight is produced in the second reactor, and it is preferable that the polymerization temperature of the first reactor is from 40 to 60° C., and the polymerization temperature of the second reactor is from 50 to 80° C. When the polymerization temperature of the first reactor is too high, the molecular weight of a polymer having high molecular weight may become insufficient. When the polymerization temperature of the second reactor is too low, it may be necessary to use a molecular weight controlling agent in large amount.

On the other hand, the molecular weight controlling agent can be added to either the first reactor or the second reactor or to both of them. If the use amount in the first reactor is decreased and the use amount in the second reactor is increased, it is preferable that sufficient amount of high molecular weight polymer and low molecular weight polymer can be polymerized.

The ratio of the production amounts of copolymers in the first reactor to the second reactor is preferably within the range from 2.0/0.05 to 1/2.5. Further, a more preferable result is obtained when the copolymerization is conducted in the range from 2.0/0.1 to 2/1.5.

The component (A) can be obtained by blending two or more kinds of polymers.

Herein, a polymer having high molecular weight and a polymer having low molecular weight can be polymerized and blended simultaneously by use of a catalyst system of the known Ziegler-Natta catalyst or by co-use of known single site catalysts described above, and this is a method also suitable for mass production. In this case, a plurality of polymerization reactor are not necessarily required, and only one reactor may be used without problem.

When the component (A) is used as a polyolefin-based resin modifier, it is preferably made into a pellet.

As the form of this pellet, sphere, cylinder, lens and cube are exemplified. These can be produced by a known pellet forming method, and for example, when the component (A) is melt-mixed and extruded through an extruder and subjected to hot cut or strand cut, a pellet in the form of sphere, cylinder or lens is obtained. In this case, cut may be conducted in any flow such as water flow, air flow and the like. A pellet in the form of cube is obtained by mixing the raw material uniformly, then, molding it into a sheet by a roll and the like, and subjected the molded one to a sheet pelletizer. Regarding the size, the longest part of a pellet is preferably 3 cm or less. In the case of a pellet having larger size than 3 cm, measuring error may increase.

A pellet of the component (A) is preferably dusted with one or more of calcium stearate, calcium carbonate, barium sulfate, silica, talc, stearic acid and polyolefin powder, from the standpoints of further suppression of mutual adhesion, or suppression of bridging phenomenon of a pellet in removing out of a silo and the like. The dusting amount may be controlled depending on the size and form of a pellet according to demand. In general, it is preferably added in an amount of 0.05 to 3 parts by weight based on the pellet. When the addition amount is too low, the effect for further suppressing mutual adhesion may not be manifested. When the addition amount is too high, it may be a cause for decrease in physical property and the like and increase in production cost. In particular, when the transparency of the final product is important, a polyolefin powder is preferably used. As the polyolefin powder, polyethylene-based resins and polypropylene-based resins are listed.

The average particle size of a polyolefin powder is preferably 500 μm or less, particularly preferably 300 μm or less. When the particle size is larger, adhesion on the surface of a pellet may not be occurred and the mutual adhesion property-improving effect may not be obtained.

The component (B) in the present invention is a polyolefin-based resin having a tensile stress $M_{100}$ measured according to JIS-K-6251 of 2.5 MPa or more. The component (B) should has a tensile stress $M_{100}$ measured according to JIS-K-6251 of 2.5 MPa or more, preferably 3.0 MPa or more. When this value is too low, a molded article obtained by molding the resulting thermoplastic elastomer composition may be poor in strength Examples of the component (B) include polyethylene-based resins such as high density polyethylene, middle density polyethylene, low density polyethylene, LLDPE (linear low density polyethylene); polypropylene-based resins, polybutene-based resins, poly-4-methyl-pentene-1, ethylene-vinyl acetate copolymer resin, ethylene-methyl methacrylate copolymer resin, ethylene-methacrylate copolymer resin, ethylene-acrylate copolymer resin, ethylene-methacrylic acid copolymer resin, ethylene-acrylic acid copolymer resin, ethylene-styrene copolymer resin and the like. Further, two or more components (B) may also be co-used.

The Q value (weight-average molecular chain length/number-average molecular chain length) of the component (B) in GPC measurement is preferably 3 or more, more preferably 3.5 or more, from the standpoint of improvement of the extrusion processability of a molded article obtained by molding the resulting thermoplastic elastomer composition. For measuring the Q value, the method described in the column of the component (A) may advantageously be used.

The thermoplastic elastomer composition of the present invention comprises 5 to 95 wt % of the component (A) and 5 to 95 wt % of the component (B), preferably comprises 10 to 90 wt % of the component (A) and 10 to 90 wt % of the component (B), more preferably comprises 20 to 80 wt % of the component (A) and 20 to 80 wt % of the component (B).

When the amount of the component (A) is too low (that is, the amount of the component (B) is too high), a molded article obtained by molding the resulting thermoplastic elastomer composition is poor in flexibility and extrusion processability, particularly, shape retaining property, while when the amount of the component (A) is too high (that is, the amount of the component (B) is too low), a molded article obtained by molding the resulting thermoplastic elastomer composition is poor in strength.

The thermoplastic elastomer composition of the present invention should has a flowability index I according to a test for flow properties with a capillary rheometer of 1.35 or more, preferably of 1.40 or more, more preferably of 1.50 or more. When this index is too low, the non-Newtonian property of melt flowability is insufficient, and a sufficient effect for improving extrusion processability is not obtained. Higher flowability index is preferable from the standpoint of extrusion processability, providing the constitution conditions of the present invention are satisfied.

A test for flow properties with a capillary rheometer and calculation of flowability index are conducted according to the following methods.

Measuring apparatus: Capirograph 1C, manufactured by Toyo Seiki Seisaku-Sho, Ltd.

Die: capillary diameter of 1 mm, capillary length of 10 mm

Temperature: 190° C.

Shear rate: 12, 37, 61, 122, 365, 608 ($s^{-1}$)

The shear viscosity was measured at each shear rate.

Figure 1:
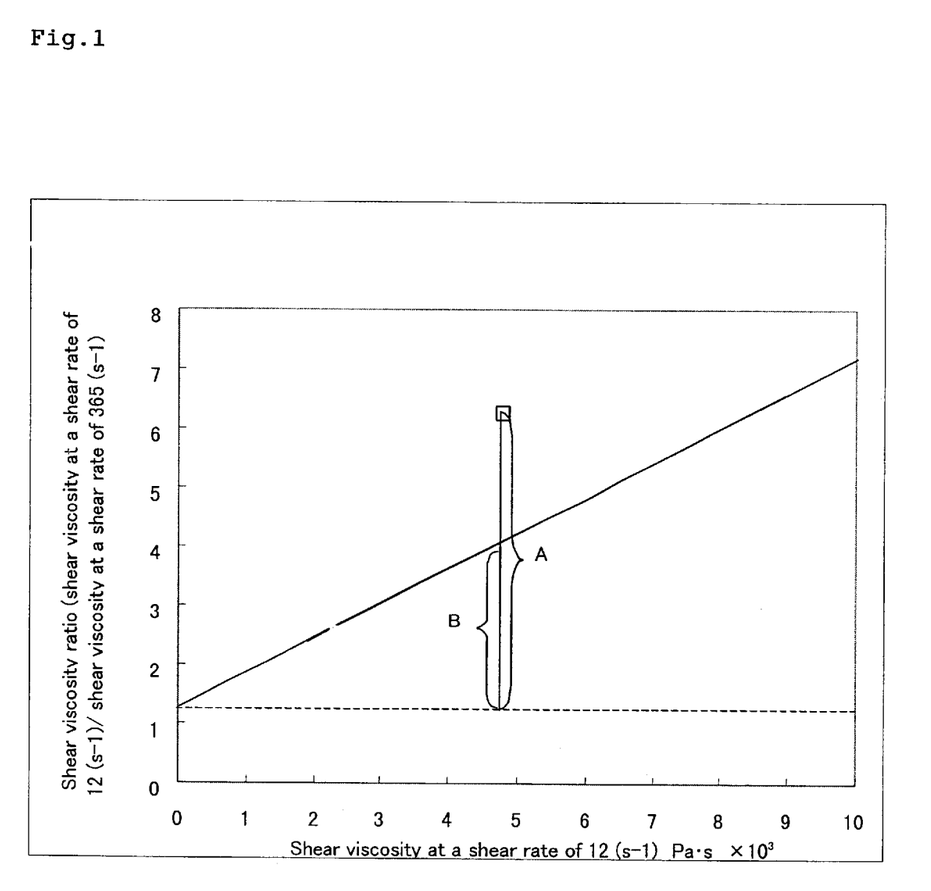
FIG. 1 is a plot diagram of a ratio of shear viscosity versus shear viscosity in calculating flowability index.

The flowability index, I=A/B, was calculated from the shear viscosity ratio (shear viscosity at a shear rate of 12 ($s^{-1}$)/shear viscosity at a shear rate of 365 ($s^{-1}$)) and plot (see, FIG. 1) of the shear viscosity at a shear rate of 12 ($s^{-1}$) The solid line in the figure is a master curve of EPM which has a Q value by GPC measurement of 1.8 and has no long chain branching, and represented by the formula $Y=0.5917 \times 10^{-3}X+1.2640$. When the plot of a thermoplastic elastomer composition shifts toward positive direction of Y axis (shear viscosity ratio), the non-Newtonian property of the composition is higher, and it is related to extrusion processability, for example, melt flow phenomenon of extruded surface and the like.

In the present invention, there may be appropriately compounded, as the additional component, additives such as an antioxidant, antistatic agent, anti-weathering agent, ultraviolet absorber, stripping agent, dispersing agent and the like, coloring agents such as carbon black and the like, fillers such as glass fiber, carbon fiber, metal fiber, aramide fiber, glass bead, asbestos, mica, calcium carbonate, potassium titanate whisker, talc, barium sulfate, glass flake and the like, or other rubber-like polymers or thermoplastic resins and the like, in addition to the above-mentioned components.

The thermoplastic elastomer composition of the present invention can also be subjected to cross-linking such as sulfur cross-linking, peroxide cross-linking, metal ion cross-linking, silane cross-linking, water cross-linking and the like, by conventionally known methods, if necessary.

For obtaining the thermoplastic elastomer composition of the present invention, the components (A) and (B) and additional components appropriately used may advantageously be kneaded by a usual kneading machine, for example, a rubber mill, brabender mill, Banbury mixer, pressure kneading, twin screw extruder and the like. The kneading machine may be any of closed type machine or open type machine, and a closed type machine which can be substituted with an inert gas is preferable. The kneading temperature is a temperature at which all of the mixed components are melted, and usually from 160 to 250° C., preferably from 180 to 240° C. The kneading time is usually from about 3 to 10 minutes when a kneading machine such as a pressure kneader, Banbury mixer and the like is used, though the kneading time is not determined since it depends on the kind and amount of the component mixed and the kind of the kneading machine. In the kneading process, components may be kneaded at one time, alternatively, there may also be adopted a multi-step division kneading method in which a part of constituents components are kneaded, and then the remaining components are added and the kneading is continued.

The thermoplastic elastomer composition and ethylene-α-olefin copolymer of the present invention are excellent particularly as a material for extrusion molding, and can be melt-extruded through an extruder equipped with a mold in the form of the molded article, at the tip of the extruder, and cooled and cut to obtain a heteromorphic extrusion-molded article.

Further, the thermoplastic elastomer composition and ethylene-α-olefin copolymer of the present invention are excellent particularly as a material of calender molding, and a calender molded article can be obtained by a sheeting process in which a smooth sheet having higher thickness accuracy is produced continuously, a doubling process in which a sheet having higher thickness accuracy containing no pin hole is produced continuously in laminating the same or different thermoplastic elastomer compositions and thermoplastic resin compositions, a topping process in which a composite is continuously produced by laminating cloth and the like onto a sheet, a friction process in which a thermoplastic elastomer composition is imprinted into cloth for the purpose of improving adhesion, or a profiling process in which a carved pattern is made on the surface of a roll and this pattern is transcribed continuously onto the surface of a sheet.

The thermoplastic elastomer composition and ethylene-α-olefin copolymer of the present invention can be used in parts such as a packing, housing and the like of automobile interior or exterior parts and weak electric parts, industrial parts, water-proof parts and the like, in stead of the conventional soft vinyl chloride-based resins. Among them, due to flexibility, excellent extrusion processability, further, the absence of bleed, they can be used in a hose, tube, gasket and packing. Regarding use examples thereof, as the hose and tube use, there are listed an air hose, water hose, reinforcing agent-containing air hose, reinforcing agent-containing water hose and medical tube, as the gasket use, there are listed an aluminum sash sealing gasket and gasket around doors of an automobile, and as the packing use, there is listed a packing of a refrigerator door.

EXAMPLES

The following examples further illustrate the present invention specifically, but do not limit the scope of the present invention. In the present invention, the term excellent extrusion processability means that the surface skin of the extrusion-molded article is smooth and the appearance of the resulting final product does not deteriorate. In the present invention, the term excellent calender processability means that sheet removal from the roll surface can be conducted easily.

[I] Production and Evaluation of Copolymer
Measurements were conducted as described below.
(1) Measurement by Differential Scanning Calorimeter (DSC)
Measurements were conduced at a rate of 10° C./min. in any of temperature rising process and constant temperature process, using a differential scanning calorimeter (DSC220C, manufactured by Seiko Instruments Inc.).

(2) Measurement by GPC

The GPC measurement was conducted at an elution temperature of 140° C. using 150° C. manufactured by Waters, Shodex Packed ColumnA-80 M (manufactured by Showa Denko K.K.) as a column, and polystyrene (manufactured by Tosoh Corp., molecular weight; 68–8,400, 000) as a molecular weight reference material. The resulted weight-average molecular weight in terms of polystyrene was represented by Mw, the resulted number-average molecular weight in terms of polystyrene was represented by Mn, and the ratio of them (Q value) was molecular weight distribution, and the higher molecular weight peak height (X1), lower molecular weight peak height (X2) in a molecular weight distribution curve and the ratio (H=X1/X2) of them were measured. For preparing a measuring sample, about 5 mg of a polymer was dissolved in 5 ml of o-dichlorobenzene so as to obtain a concentration of about 1 mg/ml. The resulted sample solution (400 µl) was injected, and detection was conducted by a refractive index detector at an elution solvent flow rate of 1.0 ml/min.

(3) Flexibility

The hardness of a copolymer was measured according to JIS-K-6253.

(4) Tensile Stress

A copolymer was press-molded at 150° C. to obtain a sheet of 2 mm thickness, then, the tensile stress $M_{100}$ of the copolymer was measured according to JIS-K-6251. A specimen was made by using No. 3 dumbbell.

(5) Preparation and Evaluation of Copolymer Pellet

A copolymer was heated for 30 minutes in a Geer oven at 100° C., then, a sheet of 4 mm thickness was molded by 10 inch open rolls. This sheet was ground by a sheet pelletizer to obtain a pellet in the form of cube. This pellet was dusted with 0.18 g of calcium stearate and 0.18 g of Irganox 1076 (antioxidant, manufactured by Chiba Specialty Chemicals) per 150 g of the pellet, and this was filled in a glass beaker (diameter: 8.6 cm), charged with a load of 1900 g, left for 14 hours under atmosphere of 40° C., then, the mutual adhesion of the pellet was evaluated.

Judge of Mutual Adhesion of Pellet

1: The form of a pellet is completely kept, and no adhesion is found between pellets at all.

2: Though the form of a pellet is kept, and adhesion is found between pellets.

3: The form of a pellet is not kept, and adhesion is found between pellets.

(6) Evaluation of Bleeding Property

A copolymer was press-molded at 150° C. to obtain a sheet of 2 mm thickness, then, left for 48 hours, and the bleeding property of the surface of the sheet was evaluated.

Judge of Bleeding Property

◯: The surface of a sheet is clean, and no stickiness is found by finger touch.

Δ: The surface of a sheet is somewhat cloudy, and stickiness is found by finger touch.

X: An oil film is observed on the surface of a sheet.

(7) Evaluation of Extrusion Processability

The pellet obtained in the method of (5) was extrusion-molded using a 40 mm φ single screw extruder (full flight screw L/D28) through a flat die of 70 mm width, and the extruded surface and appearance of the resulted molded article were observed.

Judge of Extruded Surface

◯: Extruded surface is smooth.

X: Extruded surface is not smooth, but rough.

Judge of Appearance

◯: Extrusion-molded article keeps edge in the form of a die even after molding.

X: Molded article causes disintegration after extrusion-molding, and edge in the form of a die is not kept.

Example 1

(Synthesis of Component (A)-1)

Into the lower portion of a 100 L reactor made of stainless steel equipped with a stirrer were continuously fed 62.8 kg of hexane as a polymerization solvent and ethylene and propylene at rates of 5.90 kg and 22.44 kg per hour, respectively. $VO(O\text{-iso-}C_3H_7)_3$ and ethylaluminum sesquichloride (EASC) were fed continuously as a catalyst, at ratios of 2.22 g and 7.79 g per hour, respectively, and the temperature of the polymerization chamber was kept at 50° C. A part of the polymerization liquid in the first reactor was extracted, and a polymer was allowed to deposit and dried by steam stripping. A copolymer was thus obtained at a rate of 4.6 kg per hour. The control of the molecular weight was conducted by using hydrogen. The results are shown in Table 1.

Example 2

(Synthesis of Component (A)-2)

According to the same manner as in Example 1, hexane was fed at a rate of 62.8 kg per hour and ethylene and propylene were fed at rates of 5.44 kg and 23.39 kg per hour, respectively, continuously. $VO(O\text{-iso-}C_3H_7)_3$ and ethylaluminum sesquichloride (EASC) were fed continuously as a catalyst, at ratios of 0.70 g and 2.49 g per hour, respectively, and the temperature of the polymerization chamber was kept at 50° C. A part of the polymerization liquid in the first reactor was extracted, and a polymer was allowed to deposit and dried by steam stripping. A copolymer was thus obtained at a rate of 2.6 kg per hour. The control of the molecular weight was conducted by using hydrogen. The results are shown in Table 1.

Example 3

(Synthesis of Component (A)-3)

According to the same manner as in Example 1, hexane was fed at a rate of 62.8 kg per hour and ethylene and propylene were fed at rates of 5.44 kg and 25.78 kg per hour, respectively, continuously. $VO(O\text{-iso-}C_3H_7)_3$ and ethylaluminum sesquichloride (EASC) were fed continuously as a catalyst, at ratios of 0.64 g and 2.24 g per hour, respectively, and the temperature of the polymerization chamber was kept at 50° C. A part of the polymerization liquid in the first reactor was extracted, and a polymer was allowed to deposit and dried by steam stripping. A copolymer was thus obtained at a rate of 2.0 kg per hour. The control of the molecular weight was conducted by using hydrogen. The results are shown in Table 1.

Example 4

(Synthesis of Component (A)-4)

According to the same manner as in Example 1, hexane was fed at a rate of 62.8 kg per hour and ethylene and propylene were fed at rates of 5.44 kg and 23.39 kg per hour, respectively, continuously. $VO(O\text{-iso-}C_3H_7)_3$ and ethylaluminum sesquichloride (EASC) were fed continuously as a catalyst, at ratios of 0.78 g and 2.72 g per hour, respectively, and the temperature of the polymerization chamber was kept at 50° C. A part of the polymerization liquid in the first reactor was extracted, and a polymer was allowed to deposit and dried by steam stripping. A copolymer was thus obtained at a rate of 2.2 kg per hour. The control of the molecular weight was conducted by using hydrogen. The results are shown in Table 3.

Comparative Example 1

According to the same manner as in Example 1, hexane was fed at a rate of 62.8 kg per hour and ethylene and propylene were fed at rates of 5.44 kg and 23.39 kg per hour, respectively, continuously. Additionally, 5-ethylidene-2-norbornene as the third component was fed at a rate of 0.81 kg per hour. VO(O-iso-$C_3H_7$)$_3$ and ethylaluminum sesquichloride (EASC) were fed continuously as a catalyst, at ratios of 6.95 g and 24.33 g per hour, respectively, and the temperature of the polymerization chamber was kept at 50° C. A part of the polymerization liquid in the first reactor was extracted, and a polymer was allowed to deposit and dried by steam stripping. A copolymer was thus obtained at a rate of 4.9 kg per hour. The control of the molecular weight was conducted by using hydrogen. The results are shown in Table 2.

Comparative Example 2

According to the same manner as in Example 1, hexane was fed at a rate of 120.3 kg per hour and ethylene and propylene were fed at rates of 4.34 kg and 8.69 kg per hour, respectively, continuously. VO(O-iso-$C_3H_7$)$_3$ and ethylaluminum sesquichloride (EASC) were fed continuously as a catalyst, at ratios of 2.27 g and 4.77 g per hour, respectively, and the temperature of the polymerization chamber was kept at 55° C. A part of the polymerization liquid in the first reactor was extracted, and a polymer was allowed to deposit and dried by steam stripping. A copolymer was thus obtained at a rate of 4.0 kg per hour. The control of the molecular weight was conducted by using hydrogen. The results are shown in Table 2.

Comparative Example 3

According to the same manner as in Example 1, hexane was fed at a rate of 108.4 kg per hour and ethylene and propylene were fed at rates of 6.45 kg and 15.1 kg per hour, respectively, continuously. VOCl$_3$, ethanol and ethylaluminum sesquichloride (EASC) were fed continuously as a catalyst, at ratios of 2.9 g, 1.4 g and 17.1 g per hour, respectively, and the temperature of the polymerization chamber was kept at 52° C. A part of the polymerization liquid in the first reactor was extracted, and a polymer was allowed to deposit and dried by steam stripping. A copolymer was thus obtained at a rate of 6.5 kg per hour. The control of the molecular weight was conducted by using hydrogen. The results are shown in Table 3.

The results in Tables 1 to 3 teach the following matters. The ethylene-propylene copolymers of Examples 1 to 4 satisfying the conditions of the present invention do not cause bleeding of lower molecular weight components, and manifest excellent flexibility, extrusion processability, and handling property of a pellet.

[III] Production and Evaluation of Thermoplastic Elastomer Composition

The compositions shown in Tables 4 to 8 were kneaded for 5 minutes at a temperature of 130° C. and a screw revolution of 100 rpm using a Plasti-Corder with a roller mixer (manufactured by Brabender OHG). The compositions were press-molded at 150° C., and subjected to the following tests. They were evaluated in the same manner except that the kneading temperature was 200° C. and the press-molding temperature was 200° C. in Brabender Plasti-Corder in example 8 and Comparative Example 3, Tensile test: The tensile stress ($M_{100}$), tensile strength at break (TB) and elongation at break (EB) were measured according to JIS-K-6251.

Hardness: The hardness by Duro type A hardener was measured according to JIS-K-6253.

Flowability: The melt flow rate at 190° C. or 230° C. was measured according to JIS-K-7210.

A test for flow properties with a capillary rheometer and calculation of flowability index: Each Shear viscosity was measured using Capirograph 1C (manufactured by Toyo Seiki Seisaku-Sho, Ltd.) at a furnace body temperature of 190° C., a capillary diameter of 1 mm and a capillary length of 10 mm, at a shear rate of 12, 37, 61, 122, 365, 608 ($s^{-1}$)

The flowability index was calculated from the shear viscosity ratio (shear viscosity at a shear rate of 12 ($s^{-1}$)/ shear viscosity at a shear rate of 365 ($s^{-1}$)) and plot (see, FIG. 1) of the shear viscosity at a shear rate of 12 ($s^{-1}$), providing the flowability index I=A/B.

Extrusion processability: A thermoplastic elastomer composition was allowed to flow under condition of a shear rate of 122 ($s^{-1}$)) in the above-described test for flow properties with a capillary rheometer, and the extruded surface of the composition was observed.

Judge of Extrusion Processability
○: Extruded surface is smooth.
Δ: Extruded surface reveals slight roughness.
X: Extruded surface is not smooth, but rough.

Bleeding Property:
Evaluation of Bleeding Property

A copolymer was press-molded at 150° C. or 200° C. to obtain a sheet of 2 mm thickness, then, left for 48 hours, and the bleeding property of the surface of the sheet was evaluated.

Judge of Bleeding Property
○: The surface of a sheet is clean, and no stickiness is found by finger touch.
Δ: The surface of a sheet is somewhat cloudy, and stickiness is found by finger touch.
X: An oil film is observed on the surface of a sheet.

Examples 5 to 13, 15 to 17 and Comparative Examples 4 to 8, 10 to 12

The results in Tables 4 to 8 teach the following matters. The thermoplastic elastomer compositions obtained by using the ethylene-propylene copolymer, component (A)-1 satisfying the conditions of the present invention are excellent in flexibility and extrusion processability.

Example 14 and Comparative Example 9

The compositions shown in Table 9 were melt-kneaded for 10 minutes at a rotor revolution of 50 rpm using a 16 L sealed type mixer. Then, a sheet of 4 mm thickness was molded by 8 inch open rolls, and was ground by a sheet pelletizer to obtain a pellet in the form of cube. This pellet was dusted with 0.12 g of calcium stearate and 0.12 g of Irganox 1076 (antioxidant, manufactured by Chiba Specialty Chemicals) per 100 g of the pellet, then, this was processed into a tube having an outer diameter of 12 mm and a thickness of 1.5 mm, using a 50 mm φ single screw extruder (screw L/D=24), at a screw revolution of 30 rpm, a die temperature of 160° C., an adapter temperature of 160° C.

and a cylinder temperatures from 130 to 160° C., a drawing rate of 3.5 m/min., and the extruded ace of the resulted tube was observed.

Judge of Extrusion Processability
○: Extruded surface is smooth.
X: Extruded surface is not smooth, but rough.

TABLE 1

|  |  | Example 1 | Example 2 | Example 3 |
|---|---|---|---|---|
| Ethylene content | wt % | 73.1 | 76.3 | 66.3 |
| Propylene content | wt % | 26.9 | 23.7 | 33.7 |
| ENB content | wt % | 0 | 0 | 0 |
| $ML_{1+4}$ 100° C. |  | 42.3 | 40.4 | 55.3 |
| GPC measurement result |  |  |  |  |
| Q | Mw/Mn | 7.7 | 9.0 | 10.1 |
| Mn |  | $4.1 \times 10^4$ | $3.5 \times 10^4$ | $4.1 \times 10^4$ |
| Mw |  | $31.8 \times 10^4$ | $31.4 \times 10^4$ | $41.4 \times 10^4$ |
| H | X1/X2 | 2.4 | 2.0 | 2.6 |
| Molecular weight distribution form |  | Bimodal | Bimodal | Bimodal |
| Area of lower molecular weight parts having chain lengths of 100 Å or less | % | 1.0 | 0.6 | 0.4 |
| DSC measurement result |  |  |  |  |
| Fusion heat of crystal in the range from 50 to 100° C. | mJ/mg | 9.2 | 17.5 | 11.7 |
| $M_{100}$ | MPa | 1.3 | 1.8 | 1.3 |
| Hardness (Duro A) |  | 57 | 68 | 59 |
| Mutual adhesion of pellet |  | 1 | 1 | 1 |
| Bleeding property |  | ○ | Δ | ○ |

TABLE 2

|  |  | Comparative example 1 | Comparative example 2 |
|---|---|---|---|
| Ethylene content | wt % | 61.9 | 80.2 |
| Propylene content | wt % | 30.8 | 19.8 |
| ENB content | wt % | 7.3 | 0 |
| $ML_{1+4}$ 100° C. |  | 30.0 | 36.0 |
| GPC measurement result |  |  |  |
| Q | Mw/Mn | 8.0 | 4.5 |
| Mn |  | $2.8 \times 10^4$ | $5.0 \times 10^4$ |
| Mw |  | $22.6 \times 10^4$ | $22.5 \times 10^4$ |
| H | X1/X2 | 1.6 |  |
| Molecular weight distribution form |  | Bimodal | Bimodal |
| Area of lower molecular weight parts having chain lengths of 100 Å or less | % | 1.3 | 0.5 |
| DSC measurement result |  |  |  |
| Fusion heat of crystal in the range from 50 to 100° C. | mJ/mg | 1.5 |  |
| $M_{100}$ | MPa | 0.8 | 1.9 |
| Hardness (Duro A) |  | 43 | 70 |
| Mutual adhesion of pellet |  | 2 | 2 |
| Bleeding property |  | ○ | x |

TABLE 3

|  |  | Example 4 | Comparative example 3 |
|---|---|---|---|
| Ethylene content | wt % | 71.0 | 73.0 |
| Propylene content | wt % | 29.0 | 27.0 |
| $ML_{1+4}$ 100° C. |  | 40 | 52 |
| GPC measurement result |  |  |  |
| Q | Mw/Mn | 10.3 | 1.8 |
| Mn |  | $3.3 \times 10^4$ | $16.2 \times 10^4$ |
| Mw |  | $34.5 \times 10^4$ | $29.6 \times 10^4$ |
| H | X1/X2 | 2.0 |  |
| Molecular weight distribution form |  | Bimodal | Monomodal |
| Area of lower molecular weight parts having chain lengths of 100 Å or less | % | 0.6 | 0.0 |
| DSC measurement result |  |  |  |
| Fusion heat of crystal in the range from 50 to 100° C. | mJ/mg | 12.1 | 0.7 |
| $M_{100}$ | MPa | 1.3 | 1.4 |
| Extrusion processing condition |  |  |  |
| Screw revolution | rpm | 40 | 45 |
| Die temperature | ° C. | 200 | 180 |
| Cylinder temperature | ° C. | 50~130 | 110~180 |
| Extruded surface |  | ○ | x |
| Appearance |  | ○ | x |

TABLE 4

|  | Unit | Example 5 | Example 6 | Example 7 | Example 8 |
|---|---|---|---|---|---|
| (A)-1 | wt % | 70 | 60 | 50 | 30 |
| (B)-1 | wt % | 30 | 40 | 50 | 70 |
| Antioxidant | wt % | 0.12 | 0.12 | 0.12 | 0.12 |
| M100 | MPa | 1.8 | 2.1 | 2.4 | 2.9 |
| TB | MPa | 2.7 | 4.6 | 6.4 | 7.0 |
| EB | % | 740 | 930 | 870 | 840 |
| Hardness | Duro A | 68 | 70 | 75 | 79 |
| MFR 190° C. | g/10 minute | 1.0 | 1.2 | 2.4 | 3.8 |
| Flowability index I | A/B | 1.70 | 1.96 | 2.21 | 2.77 |
| Extrusion processability |  | ○ | ○ | ○ | ○ |
| Bleeding property |  | ○ | ○ | ○ | ○ |

TABLE 5

|  | Unit | Example 9 | Example 10 | Example 11 |
|---|---|---|---|---|
| (A)-1 | wt % | 70 | 60 | 50 |
| (B)-2 | wt % | 30 | 40 | 50 |
| Antioxidant | wt % | 0.12 | 0.12 | 0.12 |
| M100 | MPa | 1.7 | 2.1 | 2.3 |
| TB | MPa | 2.8 | 7.4 | 11.6 |
| EB | % | 740 | 830 | 810 |
| Hardness | Duro A | 69 | 71 | 74 |
| MFR 190° C. | g/10 minute | 0.6 | 0.8 | 1.1 |
| Flowability index I | A/B | 1.67 | 1.65 | 1.94 |
| Extrusion processability |  | ○ | ○ | ○ |
| Bleeding property |  | ○ | ○ | ○ |

TABLE 6

|  | Unit | Example 12 | Example 13 | Example 15 | Example 16 | Example 17 |
|---|---|---|---|---|---|---|
| (A)  -1 | wt % | 70 | 50 | 49 | 60 | 80 |
| (B)  -2 | wt % |  |  |  | 20 |  |
| (B)  -3 | wt % | 30 |  |  |  |  |
| (B)  -4 | wt % |  | 50 |  |  |  |
| (B)  -5 | wt % |  |  | 30 |  |  |
| (B)  -6 | wt % |  |  | 21 | 20 |  |
| (B)  -7 | wt % |  |  |  |  | 20 |
| Antioxidant | wt % | 0.12 | 0.12 | 0.12 | 0.12 | 0.12 |
| M100 | MPa | 3.2 | 2.1 | 2.7 | 2.0 | 2.4 |
| TB | MPa | 3.2 | 9.7 | 11.5 | 9.2 | 2.5 |
| EB | % | 300 | 940 | 1065 | 1045 | 320 |
| Hardness | Duro A | 77 | 72 | 80 | 72 | 81 |
| MFR 190° C. | g/10 minute | 0.9 | 1.3 | 1.1 | 0.8 | 0.5 |
| Flowability index I | A/B | 1.52 | 2.38 | 1.52 | 1.35 | 1.38 |
| Extrusion processability |  | ○ | ○ | ○ | ○ | Δ |
| Bleeding property |  | ○ | ○ | ○ | ○ | ○ |

TABLE 7

|  | Unit | Comparative example 4 | Comparative example 5 | Comparative example 6 | Comparative example 7 |
|---|---|---|---|---|---|
| (B)-1 | wt % | 100 |  |  |  |
| (B)-2 | wt % |  | 100 |  |  |
| (B)-3 | wt % |  |  | 100 |  |
| (B)-4 | wt % |  |  |  | 100 |
| M100 | MPa | 4.0 | 3.8 |  | 3.2 |
| TB | MPa | 9.0 | 17.9 |  | 10.5 |
| EB | % | 800 | 750 |  | 860 |
| Hardness | Duro A | 84 | 85 | 100 | 81 |
| MFR 190° C. | g/10 minute | 5.6 | 2.3 | 8.0 | 5.4 |
| Flowability index I | A/B | 3.44 | 2.69 | 4.53 | 1.57 |
| Extrusion processability |  | ○ | ○ | ○ | ○ |
| Bleeding property |  | ○ | ○ | ○ | ○ |

TABLE 8

|  | Unit | Comparative example 8 | Comparative example 10 | Comparative example 11 | Comparative example 12 |
|---|---|---|---|---|---|
| (C) | wt % | 70 |  |  |  |
| (B)-1 | wt % | 30 |  |  |  |
| (B)-5 | wt % |  | 100 |  |  |
| (B)-6 | wt % |  |  | 100 |  |
| (B)-7 | wt % |  |  |  | 100 |
| Antioxidant | wt % | 0.12 |  |  |  |
| M100 | MPa | 1.8 | 5.9 | 4.2 |  |
| TB | MPa | 2.7 | 13.0 | 32.1 | 27.5 |
| EB | % | 660 | 760 | 720 | 50 |
| Hardness | Duro A | 68 | 94 | 85 | 100 |
| MFR 190° C. | g/10 minute |  | 6.0 | 5.1 | 5.1 |
| Flowability index I | A/B | 1.13 | 3.36 | 1.27 | 2.04 |
| Extrusion processability |  | x | ○ | x | ○ |
| Bleeding property |  | ○ | ○ | ○ | ○ |

TABLE 9

|  | Unit | Example 14 | Comparative example 9 |
|---|---|---|---|
| (A)-1 | wt % | 60 |  |
| (B)-2 | wt % | 40 | 40 |
| (C) | wt % |  | 60 |
| Flowability index I | A/B |  | 1.34 |
| Extrusion processability |  | ○ | x |

(B)-1: Ethylene-methyl methacrylate copolymer resin (methyl methacrylate content: 25 wt %, MFR 190° C.=5.6 under a load of 2.16 kg)

(B)-2: Ethylene-vinyl acetate copolymer resin (vinyl acetate content: 26 wt %, MFR 190° C.=2.3 under a load of 2.16 kg)

(B)-3: Random polypropylene (MFR 230° C.=8.5 under a load of 2.16 kg)

(B)-4: Ethylene-butene-1 copolymer resin (butene-1 content: 19 wt %, density=0.882 g/cm$^3$, MFR 190° C.=5.4 under a load of 2.16 kg)

(B)-5: Ethylene-vinyl acetate copolymer resin (vinyl acetate content: 10 wt %, MFR 190° C.=6.0 under a load of 2.16 kg)

(B)-6: Ethylene-hexene-1 copolymer resin (hexane-1 content: 17 wt %, density=0.885 g/cm$^3$, MFR 190° C.=5.1 under a load of 2.16 kg)

(B)-7: High density polyethylene 230J (manufactured by Idemitsu Petrochemical Co., Ltd.)

(C): Ethylene-propylene copolymer (propylene content: 27.0 wt %, Mooney viscosity: $ML_{1+4}$100° C.=52, Q value in QPC measurement=1.8, tensile stress M100=1.4 Mpa, revealing a monomodal molecular weight distribution curve) Antioxidant: Irganox 1076 (antioxidant, manufactured by Chiba Specialty Chemicals)

As described above, according to the present invention, there are obtained a thermoplastic elastomer composition which has excellent flexibility and processability, manifests no bleeding of lower molecular weight component, and is excellent particular in extrusion processability and calender processability, and an extrusion-molded article obtained by extrusion-molding this thermoplastic elastomer composition, or a calender-molded article obtained by calender-molding this thermoplastic elastomer composition, and an ethylene-α-olefin copolymer.

What is claimed is:

1. An ethylene-α-olefin copolymer which comprises ethylene and an α-olefin having 3 to 8 carbon atoms, wherein the copolymer has an α-olefin content of from 20 to 33.7 wt %, has a Mooney viscosity: $ML_{1+4}100°$ C. of from 20 to 60, has a tensile stress $M_{100}$ measured according to JIS-K-6251 of 2.5 Mpa or less, and satisfies the following conditions (c) to (g):

(c) Q value (weight-average molecular chain length/number-average molecular chain length) according to GPC measurement is 4 or more, (d) a molecular weight distribution curve which is bimodal, (e) a ratio (H=X1/X2) of high molecular weight peak height X1 to low molecular weight peak height X2 in a molecular weight distribution curve of from 2.0 to 7.0, (f) an area of low molecular weight parts having chain lengths of 100 Å or less in a molecular weight distribution curve of 3% or less, and (g) a heat of fusion of a crystal at temperature of from 50 to 100° C. which is 5 mJ/mg or more when measured by a differential scanning calorimeter (DSC).

2. The ethylene-α-olefin copolymer according to claim 1, wherein the α-olefin content is from 25 to 40 wt %.

3. A pellet made of the ethylene-α-olefin copolymer according to claim 1.

4. An extrusion molded article obtained by extrusion molding of the ethylene-α-olefin copolymer according to claim 1.

5. A hose obtained from the molded article according to claim 4.

6. A tube obtained from the molded article according to claim 4.

7. A gasket obtained from the molded article according to claim 4.

8. A packing obtained from the molded article according to claim 4.

9. A calender molded article obtained by calender molding the thermoplastic elastomer composition according to claim 1.

* * * * *